US010664342B2

(12) United States Patent
Mattila et al.

(10) Patent No.: US 10,664,342 B2
(45) Date of Patent: May 26, 2020

(54) LEAK PROTECTION OF EXECUTABLES WITH DEBUG INFORMATION

(71) Applicant: Forcepoint LLC, Austin, TX (US)

(72) Inventors: Ville Mattila, Helsinki (FI); Valtteri Rahkonen, Helsinki (FI); Otto Airamo, Helsinki (FI)

(73) Assignee: Forcepoint LLC, Austin, TX (US)

(*) Notice: Subject to any disclaimer, the term of this patent is extended or adjusted under 35 U.S.C. 154(b) by 120 days.

(21) Appl. No.: 16/106,749

(22) Filed: Aug. 21, 2018

(65) Prior Publication Data

US 2020/0065182 A1   Feb. 27, 2020

(51) Int. Cl.
| | |
|---|---|
| *G06F 11/00* | (2006.01) |
| *G06F 11/07* | (2006.01) |
| *G06F 21/55* | (2013.01) |
| *G06F 11/36* | (2006.01) |
| *G06F 21/60* | (2013.01) |
| *G06F 21/12* | (2013.01) |
| *G06F 21/14* | (2013.01) |

(52) U.S. Cl.
CPC ........ *G06F 11/0793* (2013.01); *G06F 11/366* (2013.01); *G06F 21/12* (2013.01); *G06F 21/14* (2013.01); *G06F 21/556* (2013.01); *G06F 21/60* (2013.01)

(58) Field of Classification Search
CPC .. G06F 11/0793; G06F 11/366; G06F 21/556; G06F 21/10; G06F 21/12; G06F 21/14; G06F 21/55; G06F 21/60
See application file for complete search history.

(56) References Cited

U.S. PATENT DOCUMENTS

| | | | | |
|---|---|---|---|---|
| 9,319,417 | B2 * | 4/2016 | Nelson | H04L 63/12 |
| 2015/0248564 | A1 * | 9/2015 | Feng | G06F 11/0706 726/26 |
| 2016/0323400 | A1 * | 11/2016 | Rusinov | H04L 67/06 |
| 2017/0372070 | A1 * | 12/2017 | Burdett | G06F 21/565 |

OTHER PUBLICATIONS

Petkovic, Miodrag, Miroslav Popovic, Illija Basicevic, and Djordje Saric. "A host based method for data leak protection by tracking sensitive data flow." In 2012 IEEE 19th International Conference and Workshops on Engineering of Computer-Based Systems, pp. 267-274. IEEE, 2012. (Year: 2012).*

* cited by examiner

*Primary Examiner* — Anthony J Amoroso
(74) *Attorney, Agent, or Firm* — Jackson Walker L.L.P.

(57) ABSTRACT

A method, system, and computer-usable medium are disclosed for, responsive to receipt at an information handling system of a command to transmit an executable file to a second information handling system, scanning the executable file to determine if the executable file includes debug information, and responsive to determining that the executable file includes debug information, taking remedial action with respect to the executable file.

15 Claims, 3 Drawing Sheets

LEAK PROTECTION OF EXECUTABLES WITH DEBUG INFORMATION

FIELD OF DISCLOSURE

The present invention relates in general to the field of computers and similar technologies, and in particular to software utilized in this field. Still more particularly, it relates to a method, system, and computer-usable medium for leak protection of executables with debug information.

BACKGROUND

While network communication among networked computers, including the use of the Internet, has many advantages, one downside to network communication is that it may render networked computers susceptible to leaking confidential or proprietary information. To illustrate, many programming languages (e.g., C, C++ and Java) have compilers which compile source code to an executable binary file. During development of these executable programs, a debug information section (e.g., using DWARF, Microsoft Program Database (PDB), or other debugging tools) may be inserted to aid developers to diagnose and associate portions of binary code to particular source code lines. Many modern compilers produce extremely detailed debug information.

Such debug information may permit one to reverse engineer logic of binary files to human understandable source code. Thus, if a developer communicates via network communication a binary executable that has detailed debug information to a network destination outside of research and development boundaries of an organization, then a great deal of intellectual property and/or confidential information may be placed at risk. Typically, organizations have release process procedures in place to produce optimized executables without debug information, but in cases of extreme haste, (e.g., when a critical patch is quickly needed), a typical release process may be circumvented, and with human error, debug information could be distributed causing potentially harmful data leakage by human mistake.

SUMMARY

In accordance with the teachings of the present disclosure, certain disadvantages and problems associated with existing approaches to network and data security have been reduced or eliminated.

In accordance with embodiments of the present disclosure, a computer-implementable method for managing network communication may include, responsive to receipt at an information handling system of a command to transmit an executable file to a second information handling system, scanning the executable file to determine if the executable file includes debug information, and responsive to determining that the executable file includes debug information, taking remedial action with respect to the executable file.

In accordance with these and other embodiments of the present disclosure, a system may include a processor, a data bus coupled to the processor, and a non-transitory, computer-readable storage medium embodying computer program code, the non-transitory, computer-readable storage medium being coupled to the data bus, the computer program code interacting with a plurality of computer operations and comprising instructions executable by the processor. The instructions may be configured for, responsive to receipt at an information handling system of a command to transmit an executable file to a second information handling system, scanning the executable file to determine if the executable file includes debug information, and responsive to determining that the executable file includes debug information, taking remedial action with respect to the executable file.

In accordance with these and other embodiments of the present disclosure, a non-transitory, computer-readable storage medium may embody computer program code, the computer program code comprising computer executable instructions configured for, responsive to receipt at an information handling system of a command to transmit an executable file to a second information handling system, scanning the executable file to determine if the executable file includes debug information, and responsive to determining that the executable file includes debug information, taking remedial action with respect to the executable file.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
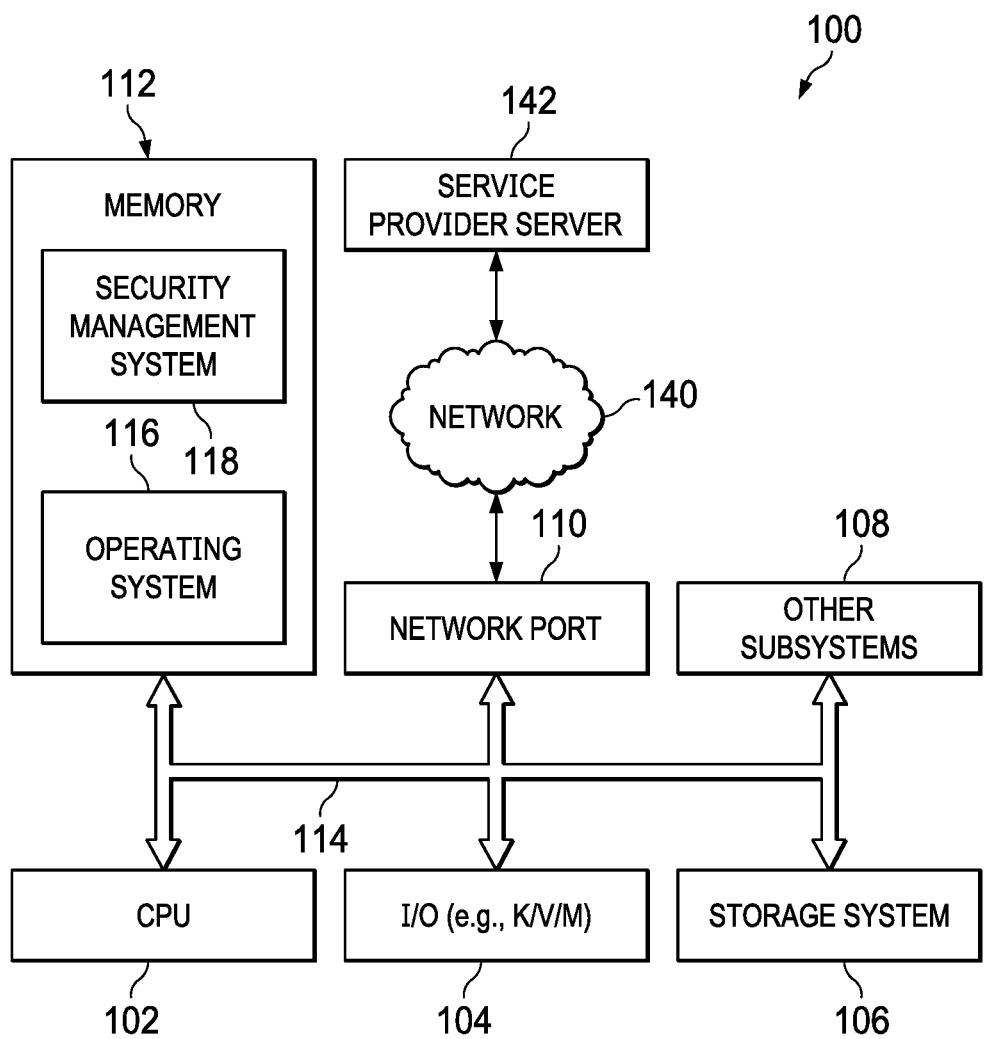
FIG. 1 illustrates an example information handling system in which the methods and systems disclosed herein may be implemented, in accordance with embodiments of the present disclosure.

FIG. 1 illustrates an example information handling system 100 in which the methods and systems disclosed herein may be implemented, in accordance with embodiments of the present disclosure. Information handling system 100 may include a processor (e.g., central processor unit or "CPU") 102, input/output (I/O) devices 104 (e.g., a display, a keyboard, a mouse, and/or associated controllers), a storage system 106, and various other subsystems 108. In various embodiments, information handling system 100 may also include network port 110 operable to couple to a network 140, which may likewise be accessible by a service provider server 142. Information handling system 100 may also include system memory 112, which may be coupled to the foregoing via one or more buses 114. System memory 112 may store operating system (OS) 116 and in various embodiments may also include a security management system 118. In some embodiments, information handling system 100 may be able to download security management system 118 from service provider server 142. In other embodiments, security management system 118 may be provided as a service from the service provider server 142.

In various embodiments, security management system 118 may be configured to enable leak protection of executable files comprising debug information, as described in greater detail below. In some embodiments, security management system 118 and the functionality thereof may improve processor efficiency, and thus the efficiency of information handling system 100, by performing network security operations with greater efficiency and with decreased processing resources as compared to existing approaches for similar network security operations. In these and other embodiments, security management system 118 and the functionality thereof may improve effectiveness in ensuring network security, and thus the effectiveness of information handling system 100, by performing network security operations with greater effectiveness as compared to existing approaches for similar network security operations. As will be appreciated, once information handling system 100 is configured to perform the functionality of security management system 118, information handling system 100 becomes a specialized computing device specifically configured to perform the functionality of security management system 118, and is not a general purpose computing device. Moreover, the implementation of functionality of security management system 118 on information handling system 100 improves the functionality of information handling system 100 and provides a useful and concrete result of improving network security and performing network security operations with greater efficiency and with decreased processing resources by enabling leak protection of executable files with debug information as described herein.

Figure 2:
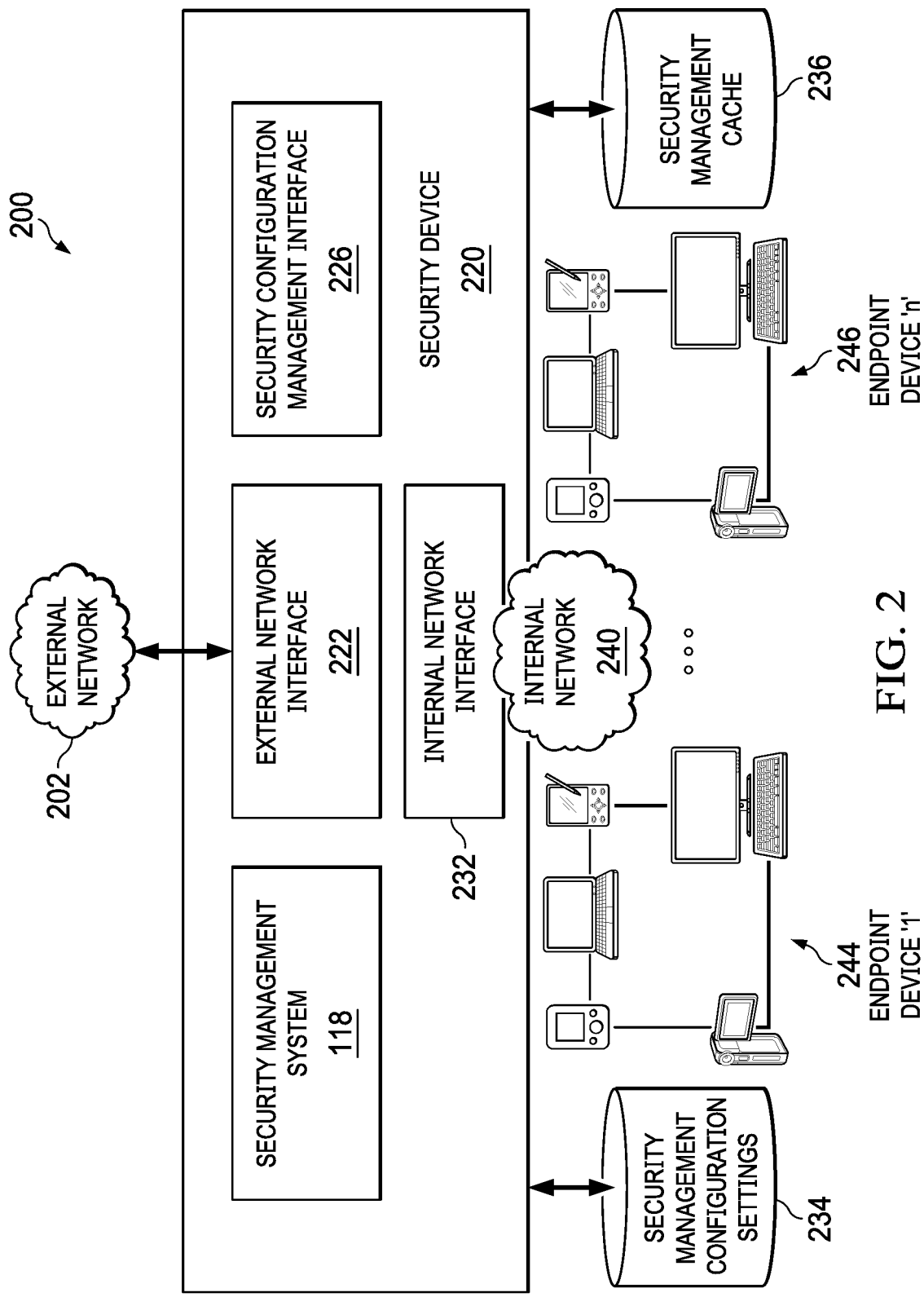
FIG. 2 illustrates a block diagram of a system for performing data leak protection with respect to executable files, in accordance with embodiments of the present disclosure.

FIG. 2 illustrates a block diagram of a system 200 for performing data leak protection with respect to executable files, in accordance with embodiments of the present disclosure. In some embodiments, a security device 220 may include an external network interface 222, a security configuration management interface 226, an internal network interface 232, and a security management system 118. Security device 220 may be implemented using any suitable information handling system 100, including without limitation a gateway, a firewall, an electronic mail server, a web server, a file transfer protocol server, or any other suitable security device capable of implementing security management system 118. In some embodiments, security device 220 may be implemented as an individual security device 220, a virtual context security device 220, or a security device 220 cluster.

Security device 220 may also include in some embodiments a repository of security management configuration settings 234 and a security management cache 236. In certain embodiments, security configuration management interface 226 may be implemented to receive instructions relating to network security policy decisions from security management system 118.

Skilled practitioners of the art will be familiar with network communication involving communicating Internet Protocol (IP) datagrams, or packets, to a target group of recipient network addresses in real-time or near real-time. In some embodiments, the target group recipient network addresses may be respectively associated with a corresponding endpoint device '1' 244 through 'n' 246. As used herein, an endpoint device refers to an information processing system such as a personal computer, a laptop computer, a tablet computer, a smart phone, a mobile telephone, a digital camera, a video camera, or other device capable of storing, processing and communicating data via a network, such as an internal network 240 interfaced to internal network interface 232. In various embodiments, the communication of the data may take place in real-time or near-real-time.

Embodiments of the invention may reflect an appreciation that network communication may represent an efficient means for communicating useful information. However, those of skill in the art will likewise appreciate that it may be desirable to secure such network communication to prevent leaks of sensitive data (e.g., confidential information, trade secrets, etc.). Many existing solutions for providing security in a network environment have disadvantages, as described in the Background section of this application. However, security management system 118 as disclosed herein may overcome these disadvantages by enabling leak protection of executable files with debug information, as described herein.

For purposes of clarity and exposition, security management system 118 is shown as integral to security device 220. However, in some embodiments, security management system 118 may be integral to an endpoint device 244, 246 and operate to perform leak protection with respect to executable files.

Figure 3:
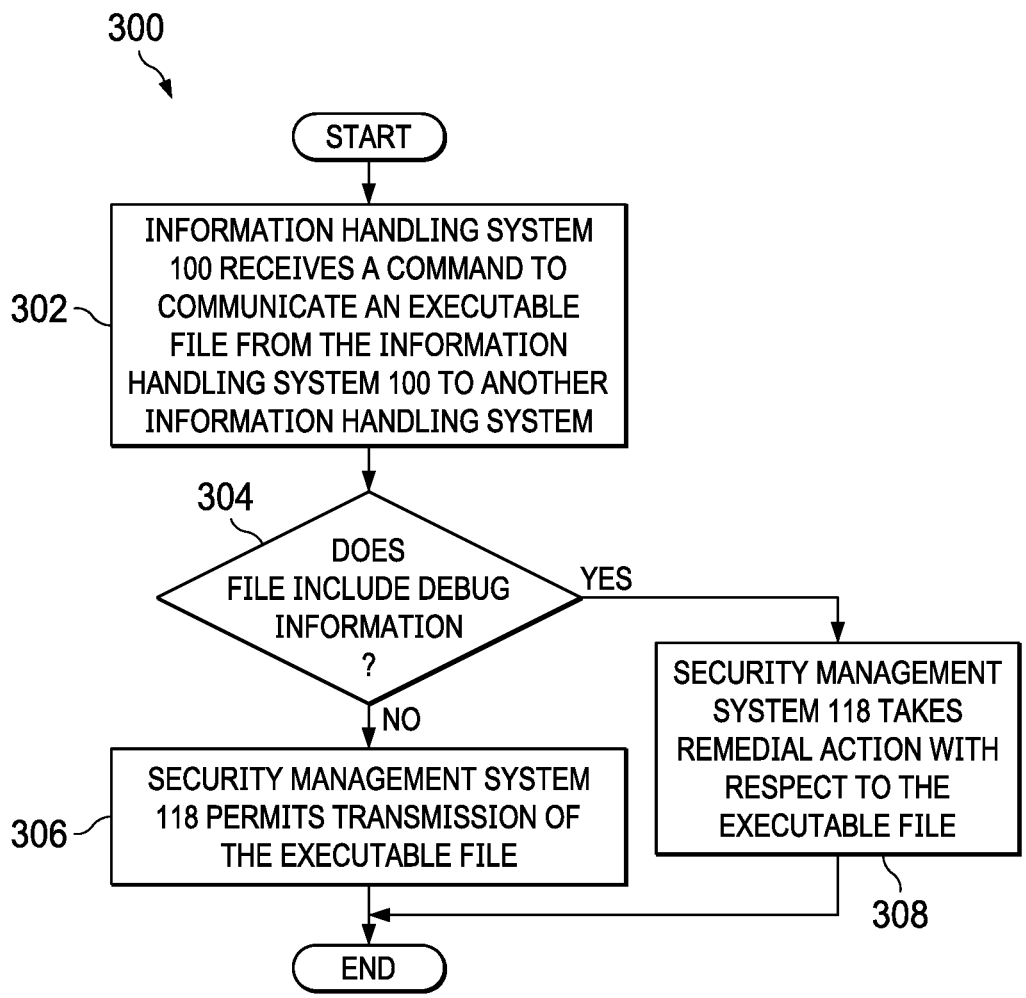
FIG. 3 illustrates a flow chart of an example method for performing data leak protection with respect to executable files, in accordance with embodiments of the present disclosure.

FIG. 3 illustrates a flow chart of an example method 300 for performing data leak protection with respect to executable files, in accordance with embodiments of the present disclosure. According to some embodiments, method 300 may begin at step 302. As noted above, teachings of the present disclosure may be implemented in a variety of configurations of information handling system 100. As such, the preferred initialization point for method 300 and the order of the steps comprising method 300 may depend on the implementation chosen.

At step 302, an information handling system 100 may receive (e.g., from a user of the information handling system 100 or from a network message sent to the information handling system 100) a command to communicate an executable file from the information handling system 100 to another information handling system (e.g., via electronic mail, file transfer protocol, or other network file transfer protocol). At step 304, responsive to receipt of the command to communicate the executable file from the information handling system 100 to another information handling system, a security management system 118 executing on the information handling system may scan the executable file to determine if the file includes debug information. If the executable file includes debug information, method 300 may proceed to step 308. Otherwise, if the executable file includes no debug information, method 300 may proceed to step 306.

At step 306, in response to the executable file including no debug information, security management system 118 may permit transmission of the executable file. After completion of step 306, method 300 may end.

At step 308, in response to the executable file including debug information, security management system 118 may take remedial action with respect to the executable file. In some embodiments, such remedial action may include preventing further transmission of the executable file. In these and other embodiments, such remedial action may include communication of a warning message to a graphical user interface of the information handling system 100. In some of such embodiments, such communication of a warning message may include a user prompt querying the user whether or not to transmit the executable file despite the warning.

After completion of step 308, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using CPU 102, security management system 118 executing thereon, and/or any other system operable to implement method 300. In certain embodiments, method 300 may be implemented partially or fully in software and/or firmware embodied in computer-readable media.

Although the foregoing contemplates that security management system 118 resides in security device 220, in some embodiments, security management system 118 may be implemented by a device external to security device 220, including without limitation a device within external network 202. In yet other embodiments, the functionality described above, particularly that of method 300, may be implemented within a client device (e.g., endpoint device 244, 246) and/or a cloud-based inspection system.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A computer-implementable method for managing network communication, comprising:
responsive to receipt at an information handling system of a command to transmit an executable file to a second information handling system:
scanning the executable file to determine if the executable file includes debug information; and responsive to determining that the executable file includes debug information, taking remedial action with respect to the executable file.

2. The method of claim 1, further comprising, responsive to determining that the executable file is free of debug information, permitting transmission of the executable file.

3. The method of claim 1, wherein taking remedial action comprises preventing further transmission of the executable file.

4. The method of claim 1, wherein taking remedial action comprises communicating a warning message to a graphical user interface of the information handling system.

5. The method of claim 4, wherein communicating the warning message includes providing a user prompt querying a user whether or not to transmit the executable file.

6. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for, responsive to receipt at an information handling system of a command to transmit an executable file to a second information handling system:
scanning the executable file to determine if the executable file includes debug information; and
responsive to determining that the executable file includes debug information, taking remedial action with respect to the executable file.

7. The system of claim 6, the instructions further configured for, responsive to determining that the executable file is free of debug information, permitting transmission of the executable file.

8. The system of claim 6, wherein taking remedial action comprises preventing further transmission of the executable file.

9. The system of claim 6, wherein taking remedial action comprises communicating a warning message to a graphical user interface of the information handling system.

10. The system of claim 9, wherein communicating the warning message includes providing a user prompt querying a user whether or not to transmit the executable file.

11. A non-transitory, computer-readable storage medium embodying computer program code, the computer program code comprising computer executable instructions configured for:
responsive to receipt at an information handling system of a command to transmit an executable file to a second information handling system:
scanning the executable file to determine if the executable file includes debug information; and
responsive to determining that the executable file includes debug information, taking remedial action with respect to the executable file.

12. The storage medium of claim 11, the instructions further configured for, responsive to determining that the executable file is free of debug information, permitting transmission of the executable file.

13. The storage medium of claim 11, wherein taking remedial action comprises preventing further transmission of the executable file.

14. The storage medium of claim 11, wherein taking remedial action comprises communicating a warning message to a graphical user interface of the information handling system.

15. The storage medium of claim 14, wherein communicating the warning message includes providing a user prompt querying a user whether or not to transmit the executable file.

* * * * *